United States Patent [19]

Otani et al.

[11] Patent Number: 5,017,431

[45] Date of Patent: May 21, 1991

[54] ADHESION STRUCTURES AND METHOD OF PRODUCING THE SAME

[75] Inventors: Sugio Otani, Kiryu; Hiroya Kakegawa, Yoro, both of Japan

[73] Assignee: Ibiden Company, Ltd., Ohagaki, Japan

[21] Appl. No.: 460,620

[22] Filed: Jan. 3, 1990

Related U.S. Application Data

[62] Division of Ser. No. 938,253, Dec. 5, 1986, Pat. No. 4,911,983.

[30] Foreign Application Priority Data

Dec. 10, 1985 [JP] Japan .................................. 60-278800
Dec. 11, 1985 [JP] Japan .................................. 60-279683
Oct. 29, 1986 [JP] Japan .................................. 61-257715

[51] Int. Cl.$^5$ ...................... B32B 11/00; B32B 11/08; B32B 15/08; B32B 17/10
[52] U.S. Cl. .................................. 428/420; 428/408; 428/411.1; 428/426; 428/441; 428/446; 428/457; 428/698; 428/702; 428/704; 428/489; 156/278

[58] Field of Search ............ 428/408, 420, 426, 411.1, 428/457, 446, 698, 704, 702, 489; 156/278

[56] References Cited

U.S. PATENT DOCUMENTS 3,109,712 11/1963 Redfern .
3,565,832 2/1971 Bilow et al. .
3,626,042 12/1971 Appleby et al. .
4,013,760 3/1977 Huschka et al. .

Primary Examiner—Allan M. Lieberman
Attorney, Agent, or Firm—Parkhurst, Wendel & Rossi

[57] ABSTRACT

An adhesive made from a thermosetting resin composition consisting of (a) a condensed polycyclic aromatic compound, (b) an aromatic crosslinking agent and (c) an acid catalyst is applied to each surface of adherends treated with a particular surface treating agent and heated at a temperature of 100°–400° C. in an oxidizing or non-oxidizing atmosphere to produce an adhesion structure. In order to provide a conductive adhesion structure, a conductive promotion catalyst is included in the adhesive. Further, a carbonaceous or graphitic adhesion structure is obtained by carbonization or graphitization of the adhesion structure.

22 Claims, No Drawings

ADHESION STRUCTURES AND METHOD OF PRODUCING THE SAME

This is a Division of application Ser. No. 06/938,253 filed Dec. 5, 1986, now U.S. Pat. No. 4,911,983.

BACKGROUND OF THE INVENTION

1. Field of the Invention

This invention relates to a novel adhesion structure using an adhesive composed of a thermosetting resin composition and a method of producing the same. More particularly, it relates to adhesion structures having improved strength, heat resistance and waterproofness or an electrical conductivity, or carbonaceous or graphitic adhesion structures.

2. Related Art Statement

As an adhesive made from a thermosetting resin, there have hitherto been known, for example, unsaturated polyester adhesives, phenolic resin adhesives, epoxy resin adhesives, polyisocyanate adhesives, bismaleimide adhesives, thermosetting polyamide adhesives and so on.

As a technique for chemically bonding the adhesive to an adherend, Japanese Patent Application Publication Nos. 36-17081 and 37-2970 disclose that chromium aminoacetate and a silane coupling agent are an effective surface treating agent for an adherend such as glass.

Furthermore, when using an epoxy resin as an adhesive, the adhesive strength is dependent upon the amount of hydroxyl groups existent on the surface of the adherend or in the epoxy resin and hydrogen bonds between the hydroxyl groups existent on the adherend and the epoxy resin contributes substantially to the adhesive force, as disclosed in K. Kanamaru, *Adhesion and Adhesives*, Dai Nippon Tosho Printing Co., Ltd., 1978, page 128.

In this article (page 133), it is also disclosed that when using a polyisocyanate as an adhesive, hydrogen atom existent in the surface of wood, hydroxyl groups existent in the surface of synthetic fiber, amino groups existent in the surface of leather or the like are strongly bonded to the adhesive through urethane or urea bonds.

A heat-resistant adhesive made from an imide modified epoxy resin is disclosed in Japanese laid open patent applications Nos. 59-166531 and 60-32821. While, a heat-resistant adhesive made from a bismaleimide is disclosed in Japanese laid open patent application No. 57-2328.

If it is intended to produce an adhesion structure having electrical conductivity by using an adhesive made from a conventionally known thermosetting resin, since the adhesive itself has no electrical conductivity, it is required to incorporate a conductive filler into the adhesive.

As a carbonaceous or graphitic adhesive, there are known some commercially available ones, but their details are not presently available.

Such adhesives are considered to be roughly classified as follows:

(1) a mixture of carbon or graphite or its precursor as an aggregate and a B-stage resin of a thermosetting resin such as phenolic resin, epoxy resin, furan resin or the like; and (2) a mixture of the same mixture as described in the above item (1) and a petroleum or coal tar pitch.

Among them, V58a (trade name, made by Sigri Elk. GmbH) is commercially available as the mixture (1), while New Coat GC (trade name, made by Dylon Industry Inc.) is commercially available as the mixture (2). Further, a tar-containing adhesive for refractory brick is disclosed in Japanese laid open patent application No. 54-114543.

Among the aforementioned adhesives each made from the thermosetting resin, the unsaturated polyester adhesive, phenolic resin adhesive, epoxy resin adhesive, polyisocyanate adhesive, thermosetting polyamide adhesive and so on have drawbacks in that the heat deformation temperature is low at the hardening state and the storage stability is poor. Further, the thermosetting polyamide adhesive is expensive. In the technique of introducing the chemical bonding as disclosed in Japanese Patent Application Publication Nos. 36-17081 and 37-2927, the adherend is limited to the glass composition and the adhesive component is limited to the epoxy resin, so that there is still a problem with the heat resistance.

When the epoxy resin is used as an adhesive component, the adhesion is dominantly contributed by hydrogen bonding between hydroxyl groups, so that the bonding force is weak as compared with the chemically covalent bond and the strength is poor.

The use of polyisocyanate has drawbacks as it is poisonous, inconvenient to handle and very sensitive to humidity during storage.

When bismaleimide is used as an adhesive component, the heat resistance is excellent, but the adhesive strength is weak as compared with that of the epoxy resin adhesive. As the heat resistance, the blistering time in a solder bath at 300° C. under normal pressures was within a range of 70–80 minutes.

In the carbonaceous or graphitic adhesives (1), the carbonization yield in the hardened resin is low and the carbonization shrinkage of the adhesive relative to the adherend is very large. Further, if the aggregate is not added to the adhesive, the adhesive strength after carbonization is remarkably low. Moreover, the thickness of the adhesive is dependent upon the grain size of the aggregate, so that a high dimensional accuracy is not obtained. Since the thermal expansion coefficient of the adhesive layer after carbonization or graphitization is unadjustable, the resulting adhesion structure is weak to thermal shock.

In the carbonaceous or graphitic adhesives (2), the carbonization yield of the thermosetting resin is low, which is intended to be solved by adding tar or pitch having a high carbonization yield. Since the pitch naturally has a thermoplasticity, however, the amount of pitch added is restricted to a certain level. If the amount of the pitch is too large, the adhesive layer is foamed or softened at the carbonization step, and the adhesive strength is low. Furthermore, the thermal expansion coefficient of the adhesive layer after carbonization or graphitization can not be controlled, so that the thermal shock resistance of the adhesive joint is considerably low.

In the adhesives (1) and (2), the bonding between the adherend and the adhesive is dependent upon the physical adhesion (i.e. anchor effect), but does not positively introduce the chemical bonding, so that it can not be said that the properties such as thermal shock resistance, dimensional stability, strength, modulus of elasticity, toughness and so on are sufficiently obtained in the resulting adhesion structure.

SUMMARY OF THE INVENTION

It is, therefore, an object of the invention to provide novel adhesion structures having improved adhesive strength, heat resistance, waterproofness and/or electrical conductivity by chemically bonding an adhesive made from a thermosetting resin composition to a functional group of an adherend surface through a surface treatment, and a method of producing the same.

Among the adhesion structures according to the invention, the adhesion structures having improved adhesive strength, heat resistance and waterproofness are characterized in that an adhesive made from a thermosetting resin composition (hereinafter referred to as COPNA resin composition) obtained by the reaction of (a) a condensed polycyclic aromatic compound having at least two rings, (b) an aromatic crosslinking agent having one or more aromatic rings with at least two hydroxymethyl or halomethyl groups and (c) an acid catalyst is bonded to each of a pair of adherends having or incorporating in its surface at least one selected from hydrogen atom, halogen atom, hydroxyl group, carbonyl group, carboxyl group, aldehyde group, epoxy group, lactone group, ether group and acid anhydride group through a surface treating agent composed mainly of the above aromatic crosslinking agent (b). On the other hand, the adhesion structures having an electrical conductivity are characterized in that the adhesive is rendered into a conjugated system having a substantially electrical conductivity through a conductive promotion catalyst.

Furthermore, the invention provides carbonaceous or graphitic adhesion structures using a thermosetting resin composition, which is small in shrinkage during hardening, high in carbonization yield and small in shrinkage during carbonization, as an adhesive. In this case, the adhesive layer is strongly bonded to the adherend, so that the high adhesive strength is fundamentally obtained after carbonization or graphitization without using an aggregate. Therefore, adhesion accuracy can be ensured in the order of a few $\mu m$ as in the case of precision machining. Further, the thermal expansion coefficient of the adhesive layer in the resulting adhesion structure is made coincident with that of the adherend by changing the component of the thermosetting resin composition and the kind and amount of the aggregate, whereby the thermal shock resistance of the adhesion structure can be improved. Therefore, the carbonaceous or graphitic adhesion structures according to the invention are suitable for use in heat-resistant members such as a jig, a crucible, a heater and so on; parts for chemical reaction apparatus requiring complicated working, parts for a heat exchanger and the like.

DESCRIPTION OF THE PREFERRED EMBODIMENTS

In the adhesive made from the COPNA resin composition according to the invention, the condensed polycyclic aromatic compound (a) may include naphthalene, anthracene, phenanthrene, pyrene, chrysene, naphthacene, acenaphthene, acenaphthylene, perylene, coronene and a mixture thereof, or coal or petroleum heavy oil, tar, pitch and so on.

In the production of carbonized or graphitized adhesion structures, it is preferable to use coal or petroleum heavy oil, tar, pitch or oxide, sulfide or halide thereof as the condensed polycyclic aromatic compound (a).

Further, the oxygen, sulfur or halogen included in the latter compound (a) may be existent alone, or as a functional group or in a ring, and the number thereof is not particularly restricted. Such oxygen, sulfur or halogen serves to enlarge the thermal expansion coefficient of the adhesive layer after carbonization or graphitization because it forms a methylene crosslink constituting the COPNA resin composition as well as a three-dimensional crosslink in the adhesive layer through dehydrogenation.

As the aromatic crosslinking agent (b) according to the invention, use may be made of aromatic compounds having one or more aromatic rings with at least two hydroxymethyl or halomethyl groups, an example of which includes p-xylylene dichloride, 1,4-benzene dimethanol (p-xylylene glycol), 9,10-anthracene dimethanol and the like.

As the acid catalyst (c) according to the invention, use may be made of a Lewis acid such as aluminum chloride, boron fluoride or the like, a proton acid such as sulfuric acid, phosphoric acid, organosulfonic acid, carboxylic acid or the like, and a mixture thereof.

When the adhesive is made from the COPNA resin composition consisting of the condensed polycyclic aromatic compound (a), the aromatic crosslinking agent (b) and the acid catalyst (c), it has experimentally been confirmed that a molar ratio of aromatic crosslinking agent to condensed polycyclic aromatic compound is preferably within a range of 0.5–4.0 and the acid catalyst is added to the mixture of the condensed polycyclic aromatic compound and aromatic crosslinking agent in an amount of 0.1–10 wt%.

Further, it has experimentally been found that in order to obtain a thermosetting intermediate reaction product (B-stage resin composition) having a substantial thermoplasticity by heating the COPNA resin composition mixture, the reaction temperature is preferably within a range of 60°–300° C. Thus, a so-called B-stage resin composition is obtained by the heating of the COPNA resin composition mixture.

The surface treating agent to be used in the invention is an aromatic crosslinking agent having one or more aromatic rings with at least two hydroxymethyl or halomethyl groups or a mixture of the aromatic crosslinking agent and the acid catalyst as mentioned above. The surface treating agent may be used in a liquid form by heating at a temperature above a melting point of the mixture or in a solution form by dissolving into a solvent. The amount of the surface treating agent added to the adherend is not critical, but it is preferably within a range of 0.01–5 wt %.

As the conductive promotion catalyst used in the production of the adhesive structure having the electrical conductivity according to the invention, it is effective to use an oxidizing agent selected from air, oxygen, ozone, sulfur, hydrogen peroxide, manganese dioxide, nitrous acid, nitric acid, permanganic acid, chromic acid, chloric acid, hypochlorous acid and a mixture thereof, or a mixture of the oxidizing agent with at least one substance selected from aluminum chloride, boron fluoride, sulfuric acid, phosphoric acid, organosulfonic acid, carboxylic acid and a mixture thereof. When the conductive promotion catalyst is a gas at room temperature, the adhesion treatment is carried out in this gas atmosphere, while when it is a solid or a liquid, it may be added to the adhesive.

The amount of the conductive promotion catalyst added is not particularly restricted. When the conductive promotion catalyst is a gaseous oxidizing agent, it is effective to conduct the adhesion treatment in the gas atmosphere, while when the solid or liquid is used as the conductive promotion catalyst, the addition amount is preferably within a range of 0.01-3%. On the other hand, when an acid is used as the conductive promotion catalyst, since the same acid is included in the surface treating agent or the COPNA resin composition, it is favorable that the excess amount of the acid is previously included or the acid is separately added in an amount of about 0.01-1%. As the acid, a strong acid is more effective and the use with the oxidizing agent increases the effect.

In the adhesive layer of the carbonaceous or graphitic adhesion structure according to the invention, carbon, graphite, expanded graphite, natural or synthetic high molecular substance or a precursor thereof may be used as an aggregate. As the functional groups of the aggregate, mention may be made of hydrogen atoms, halogen atoms, hydroxyl groups, carbonyl groups, carboxyl groups, aldehyde groups, epoxy groups, lactone groups, ether groups, acid anhydride groups and the like. Such functional groups are effective to strongly bond the aggregate to the COPNA resin composition. On the other hand, when adding the same amount of the aggregate, the thermal expansion coefficient of the adhesion layer after carbonization or graphitization tends to be made low as the number of surface functional groups becomes small or the heat treatment temperature of the aggregate becomes high. That is, the thermal expansion coefficient becomes low in the order of carbon precursor→carbon→graphite→expanded graphite.

The grain size of the aggregate is preferably not more than 10 μm from the viewpoint of the adhesion accuracy. The amount of the aggregate added is not particularly restricted, but it is favorably within a range of 1-50 wt % to the B-stage resin. The addition of the aggregate may be carried out by mixing with the COPNA resin composition before the heating reaction or with the B-stage resin after the reaction.

As the adherend to be used in the invention, mention may be made of at least one material selected from carbon, graphite, metal, metal oxide, metal carbide, metal silicide, metal boride, metal nitride, metal salt, glass, natural or synthetic polymer and a precursor thereof, or a composite material thereof, whose surface has at least one kind of surface functional groups selected from hydrogen atoms, halogen atoms, hydroxyl groups, carbonyl groups, carboxyl groups, aldehyde groups, epoxy groups, lactone groups, ether groups and acid anhydride groups. In the adhesion structure having an electrical conductivity, it is particularly advantageous to use carbon, graphite, metal, metal carbide, metal silicide or a precursor thereof or a composite material thereof, which has an electrical conductivity, as the adherend. Furthermore, when the adhesive layer is used through carbonization or graphitization, it is preferable to use carbon, graphite or a precursor thereof as the adherend. The glass, natural and synthetic polymer, carbon precursor and so on previously contain the surface functional group, so that they can be used as they are. If the small amount of the surface functional group is existent in the surface of the adherend, it is effective to further introduce the surface functional group into the adherend by wet oxidation with an oxidizing agent, dry oxidation with oxygen or the like, reducing treatment such as hydrogenation or the like, or plasma sputtering with oxygen, hydrogen or nitrogen gas.

According to the invention, the adherend is strongly bonded to the adhesive made from the COPNA resin composition through the surface treating agent composed mainly of an aromatic compound having one or more aromatic rings with at least two hydroxymethyl or halomethyl groups such as p-xylylene dichloride, 1,4-benzene dimethanol (p-xylylene glycol) or the like, whereby the adhesion structure having an improved heat resistance as well as excellent dimensional stability, strength and waterproofness can be produced.

The bonding mechanism at the boundary of the adherend is supposed as follows: two or more functionalities of the surface treating agent are bonded to the hydrogen atoms, halogen atoms, hydroxyl groups, carbonyl groups, carboxyl groups, aldehyde groups, epoxy group, lactone group, ether group, acid anhydride group or the like existent on the adherend surface by dehydration, dehalogenation or the like under an action of the acid catalyst contained in the surface treating agent or the adhesive of the COPNA resin composition, and further bonded to the aromatic hydrogens, halogens, hydroxyl groups or the like included in the adhesive of the COPNA resin composition by the similar reactions, whereby the adherend is strongly bonded to the adhesive of the COPNA resin composition through the surface treating agent.

Further, the mechanism of developing the electrical conductivity according to the invention is considered as follows:

(1) Methylene directly bonded to an aromatic ring in a hardened body of the COPNA resin composition constituting the adhesive is oxidized by an oxidizing agent, which is converted into a carbonyl group by dehydration through hydroperoxide. This carbonyl group has a conjugated relation with aromatic rings located on both sides thereof, whereby the electrical conductivity is developed. Alternatively, a quinoid structure is formed by taking out a hydrogen atom from the methylene to establish the conjugated system.

When employing pyrene as a model, the former case may be represented by the following reaction formula:

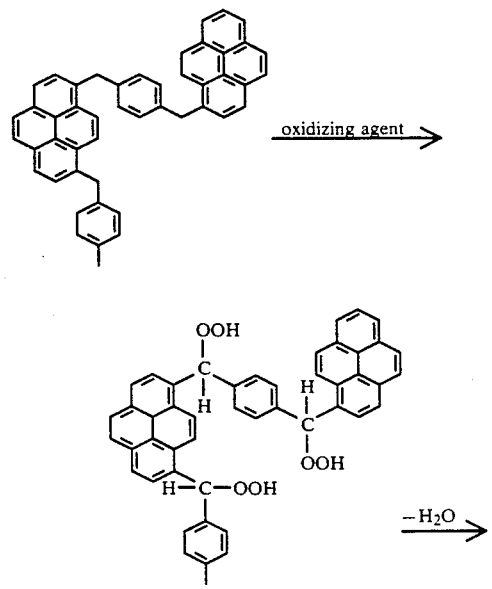

-continued

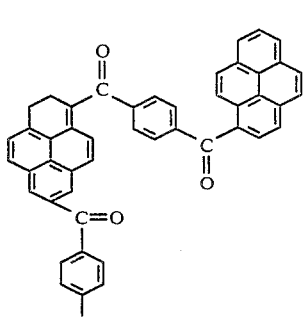

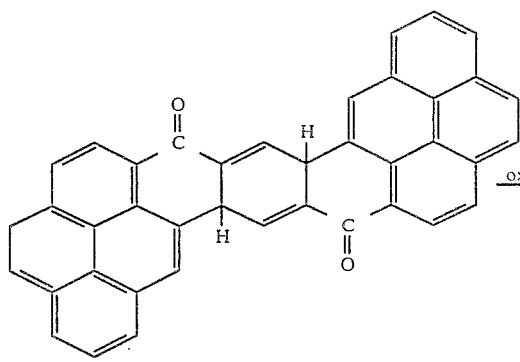

(2) When methylene directly bonded to an aromatic ring in the hardened body of the COPNA resin composition constituting the adhesive is existent in a steric hindrance position of an aromatic ring originated from the aromatic crosslinking agent to an aromatic ring originated from the condensed polycyclic aromatic compound (position A in the following formula), the aromatic ring of the condensed polycyclic aromatic compound is subjected to an electrophilic substitution with an acid, and consequently the aromatic ring originated from the aromatic crosslinking agent at the steric hindrance position is electrophilically attacked to close the ring at this position. In this case, the oxidizing agent pulls out hydrogens from the methylene and closed ring through dehydration to promote aromatization from lower temperature, whereby the electrical conductivity based on the conjugated system is developed.

When employing pyrene as a model, the above is represented by the following reaction formula:

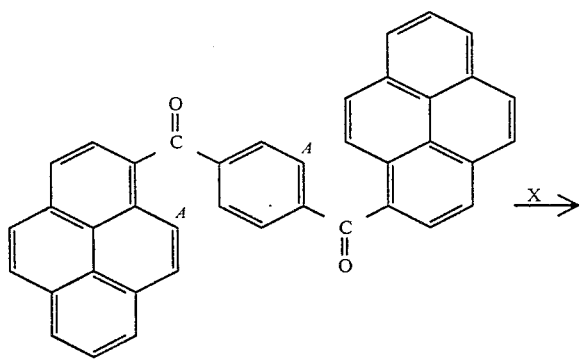

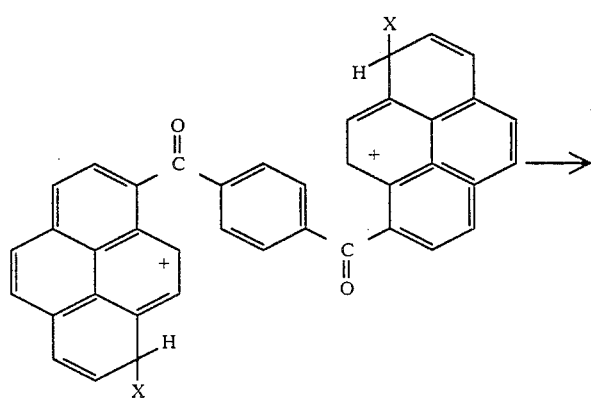

X: {Lewis acid or proton acid

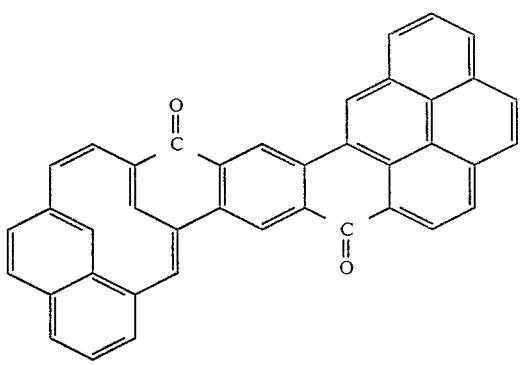

In all of the above mechanisms, if it is actually intended to give the electrical conductivity to a certain thickness of adhesive layer as a conductive adhesive, it is required that the aromatic ring originated from the condensed polycyclic aromatic compound has a size of conjugated system corresponding to the distance thereof. For this purpose, according to the invention, it is advantageous to use coal or petroleum heavy oil, tar, pitch or the like, which is particularly cheap and contains a giant condensed polycyclic aromatic molecule (the size in the pitch may extend to several hundred microns). As shown by employing pyrene as a model, it is obvious that the electrical conductivity at a micro portion is obtained by the similar mechanism when the aromatic compound has two or more rings.

In the carbonization or graphitization, the thermal expansion coefficient of the adhesive layer composed mainly of carbonized or graphitized product can be controlled in accordance with the thermal expansion coefficient of the adherend by the following four processes:

(i) use of a condensed polycyclic aromatic compound having in its molecule at least one element selected from oxygen, sulfur and halogens; or addition of sulfur, dinitronaphthalene or trioxane to an adhesive;

(ii) use of carbon precursor as an aggregate;

(iii) use of carbon, graphite or expanded graphite as an aggregate; and (iv) change of the heat treating temperature in the adhesion structure.

The processes (i) and (ii) act to raise the thermal expansion coefficient of the adhesive layer composed mainly of carbonized or graphitized product, while the processes (iii) and (iv) act to lower the thermal expansion coefficient. By properly changing the kind and amount of the above substance and further the heat treating temperature, the thermal expansion coefficient of the adhesive layer after the graphitization at a temperature of, for example, 2800° C. can be controlled within a wide range of 2.0-8.0×10$^{-6}$/° C. (50°-400° C.).

The adhesive strength of the adhesive layer composed mainly of carbonized or graphitized product is greatly improved when the surface functional group is existent in the adherend surface prior to the adhesion. The thermal shock resistance is mainly controlled by the strength, thermal conductivity, modulus of elasticity and thermal expansion coefficient. As to the improvement of thermal shock resistance in the adhesion structure, it is most important that the thermal expansion coefficient of the adherend is equal to that of the adhesive layer, and it is also important that the adhesive strength is high.

As a method of producing adhesion structures according to the invention, there may be used a method wherein the surface of the adherend is previously treated with the surface treating agent, a method wherein the surface treating agent is added to the adhesive made from the COPNA resin composition. In these methods, the surface treating agent may be used as a liquid by heating above its melting point or as a solution by dissolving into a solvent. Preferably, the adherend surface is treated with a solution of a surface treating agent in a solvent.

According to the invention, the adhesive made from the COPNA resin composition may be used as (1) an unreacted powdery mixture, (2) a powder or liquid of so-called B-stage resin composition, (3) a liquid obtained by heating the B-stage resin composition, or (4) a solution obtained by dissolving the B-stage resin composition into a solvent.

As the adhesion operation, there may be used hot pressing, fixing with a jig, screwing and so on. In this case, the adhesion temperature is within a range of 100°-400° C., preferably 150°-250° C. Moreover, it is important that the adhesion temperature and time are set so as to thermoset the adhesive after the softening and the adherend is fixed so as not to slip out of place during the adhesion.

In order to obtain an adhesion structure having a higher adhesive strength, the adhesion structure may be subjected to a post hardening step wherein it is heated within a temperature range of 100°-400° C. in an oxidizing or non-oxidizing atmosphere and then held at this temperature for a time of 30 minutes to 100 hours.

After the hardening, the carbonization is carried out by raising temperature to 600°-1500° C. at a rate of not more than 400° C./hr, preferably not more than 100° C./hr in a non-oxidizing atmosphere. On the other hand, the graphitization is carried out by raising temperature to 2000°-3000° C. at a rate of not more than 600° C./hr, preferably not more than 200° C./hr in a non-oxidizing atmosphere.

Thus, the adhesion structures having improved adhesive strength, heat resistance, dimensional stability, waterproofness and the like can be obtained.

According to the invention, the adhesion structures having an electrical conductivity are obtained without using a conductive aggregate. In some cases, the larger electrical property can be obtained by incorporating carbon, graphite, carbon precursor, or a metal such as silver, copper or the like as a conductive aggregate into the adhesive of the COPNA resin composition. In any case, the same effect of improving the electrical conductivity as in the case of using the conventional thermosetting resin can be obtained even when the amount of the conductive aggregate is small.

The adhesive used in the production of the adhesion structure according to the invention may be used as a heat-resistant paint or varnish. Further, it can be compounded with a conductive aggregate to be applied as a conductive paint for antistatic treatment, electromagnetic wave shielding, radiation plate, surface heater and so on.

Moreover, the carbonization or graphitization is particularly effective in the adhesion of carbon fiber/carbon composite.

The invention will be explained in more detail by referring to the following Examples and Comparative Examples. These Examples are merely given in illustration of the invention but should not be interpreted to limit the scope thereof.

EXAMPLE 1, COMPARATIVE EXAMPLE 1

A high density, high strength commercially available isotropic graphite material (manufactured by Ibiden Co., Ltd., trade name T-6, a bending strength: 1000 kg/cm$^2$) was worked into a block of 20×20×20 mm. An adherend surface of the block was treated with oxygen plasma by using a plasma etching apparatus BP-1 (manufactured by Samuco Co., Ltd.) for one hour under the following conditions: a pressure of 0.3 mbar and an output of 50 W, thereby introducing oxygen-containing functional groups onto the surface. A surface treating agent of an ethanol solution containing 5 wt % of p-xylene glycol [PXG] and 5 wt % of p-toluenesulfonic acid [PTS] was coated onto the adherend surface, followed by a heat treatment at 150° C. in air for 30 minutes, thereby obtaining an adherend. As an adhesive of a modified COPNA resin composition, a B-stage resin was used, which was prepared by mixing air-blown coal pitch (average molecular weight of about 600) having a softening point of 90° C. and p-xylylene glycol at a molar ratio of 1:2, adding 1 wt % of p-toluenesulfonic acid thereto and then reacting a resulting mixture at 120° C. for 40 minutes. This B-stage resin was melted at 130° C. in air and then coated onto the surface of the adherend. After adherends were bonded together and fixed by means of a jig, the B-stage resin was hardened by heat treatment at 180° in air for one hour. Post-hardening was carried out in air at 200° C. for 20 hours. For comparison, adherends coated with a commercially available phenolic resin base adhesive (manufactured by Gunei Kagaku Kogyo Co., Ltd., trade name Resitop PL-2390) were bonded together and fixed by means of a jig, and the adhesive was hardened by heat treatment at 150° C. in air for one hour. With respect to both the above adhesion structures, the resistivity (four terminal method), the electrical resistance (a tester) and the thickness of the adhesive layer in the adhesive joint (an optical microscope) were measured to obtain the results as shown in Table 1.

TABLE 1

|  | Resistivity (×10$^{-2}$ Ωcm) | Electrical resistance (Ω) | Thickness of adhesive layer (μm) |
|---|---|---|---|
| Example 1 | 4 | 0.2 | 20 |
| Comparative Example 1 | impossible to measure | 1 × 10$^6$ | 30 |

When the bending strength was measured with respect to the adhesive joint of the adhesion structure in Example 1, the adherend was broken but no change was observed in the adhesive joint.

EXAMPLE 2

Each of a commercially available soft steel and brass was worked into a block of 20×20×20 mm. A surface treating agent of an ethanol solution containing 2.5 wt % of p-xylylene glycol and 1 wt % of p-toluenesulfonic acid was coated onto an adherend surface of the block, followed by heat treatment at 150° C. in air for 30 minutes, thereby obtaining an adherend. As an adhesive of a pitch base COPNA resin composition, a B-stage resin was used, which was prepared by mixing a coal pitch (average molecular weigh: 300) of a softening point of 49° C. and p-xylylene glycol at a molar ratio of 1:2, adding 1 wt % of p-toluenesulfonic acid thereto, and reacting a resulting mixture at 120° C. for 40 minutes. This B-stage resin was melted at 130° C. in air, and coated onto the surface of the adherend. After the adherends were bonded together and fixed by means of a jig, the adhesive was hardened by heat treatment at 180° C. in air for one hour. Post-hardening was carried out at 200° C. in air for 20 hours. In order to examine electrical resistances of the adhesive joints between different adherends, measurements were carried out by means of a tester with respect to the combinations of soft steel-brass, soft steel-soft steel, and brass-brass. The results are shown in Table 2.

TABLE 2

|  | Soft steel-brass | Soft steel-soft steel | Brass-brass |
| --- | --- | --- | --- |
| Electrical resistance ($\Omega$) | 0.4 | 0.3 | 0.8 |
| Thickness of adhesive layer ($\mu$m) | 20 | 15 | 30 |

EXAMPLE 3

A commercially available graphite material was thermally treated at 500° C. in air for 30 minutes to introduce oxygen-containing functional groups into the surface thereof. After the thus treated material was immersed into a surface treating agent of an ethanol solution containing 2.5 wt % of p-xylylene dichloride and 1 wt % of p-toluenesulfonic acid, it was thermally treated at 150° C. in air for 30 minutes, thereby obtaining an adherend. As an adhesive of a COPNA resin composition, a B-stage resin was used, which was prepared by mixing naphthalene and p-xylylene glycol at a molar ratio of 1:1.75, adding 1 wt % of p-toluenesulfonic acid thereto, and reacting the resulting mixture at 130° C. in air for 40 minutes. After 0.5 wt % of aluminum chloride anhydride as a conductive promotion catalyst and 10 wt % of graphite powder ground down to 350 meshes or less as a conductive aggregate were added to the B-stage resin, the resulting mixture was melted at 140° C. in air. After the melt was left to be cooled down to room temperature, it was held between the adherends as a powder. Then, the adherends were fixed by a jig, and the adhesive was hardened by heating at 150° C. while the adherend surfaces were pressed together. The resulting adhesion structure was subjected to a post-hardening treatment at 250° C. for 10 hours. In order to examine the electrical resistance of the adhesive joint, the adhesion structure was measured by a tester. The measurement revealed that the adhesive layer had a thickness of 40 $\mu$m and exhibited an electrical resistance of 0.1 $\Omega$.

EXAMPLE 4

The graphitic adhesion structure obtained in Example 1 was so fixed in a discharge processor EP-60K (manufactured by Mitsubishi Electric Corporation) that electric current may pass through the adhesive layer, and was discharge-processed in kerosine under the following conditions: a peak electric current of 20 A and a pulse width of 60 $\mu$sec by using soft steel as works. Although a bottomclosed hole of 20×20×10 mm was worked in the soft steel in about 2 hours, no change was observed in the adhesive joint.

EXAMPLE 5

Although the adhesion structure obtained in Example 1 was treated in boiling water for 300 hours, no change was observed. On the other hand, when the specimen of Example 1 was dipped into 200° C. of 98% $H_3PO_4$ for 1400 hours, no change in weight and dimension were also observed.

EXAMPLE 6

A coal pitch (average molecular weight: about 400) of a softening point of 85° C. as a condensed polycyclic aromatic compound and p-xylylene glycol (PXG) as a crosslinking agent were mixed at a molar ratio of 1:2, to which 5 wt % of p-toluenesulfonic acid (PTS) was added. The resulting mixture was reacted at 140° C. for 40 minutes, thereby obtaining an adhesive of a B-stage COPNA resin. As an adherend, a test piece was used, which was obtained by abrasive-finishing a 2 cm² adherend surface of a graphite material (manufactured by Ibiden Co., Ltd., trade name T-6) and washing the abraded surface with supersonic waves in acetone. The thus treated surface of the adherend was treated with oxygen gas plasma by means of a plasma sputtering apparatus of CFS-8EP-55 manufactured by Tokuda Seisakusho Co., Ltd. at a pressure of 0.3 mbar and an output of 500 W for 3 hours. An ethanol solution (concentration: 0, 2.5, 5.0 or 7.5 wt %) of p-xylylene glycol and p-toluenesulfonic acid was sprayed onto the thus treated adherend surface, which was heated to 150° C. After the above adhesive was coated onto the heated adherend surface, the adherend was bonded to another adherend and fixed by a graphite jig, and then the adhesive was hardend by heating at 180° C. for 40 minutes. While the adhesive joint was kept fixed by the graphite jig, carbonization was effected by heating up to 1000° C. at a temperature-rising rate of 50°C./hr in a non-oxidizing atmosphere. Graphitization was similarly effected by heating up to 3000° C.

With respect to test pieces having undergone no oxygen gas plasma treatment, similar treatments were carried out. Tensile strength was measured with respect to test pieces after the carbonization or the graphitization. Results thereof are shown in Table 3.

TABLE 3

| Example No. | Concentration of each of PXG and PTS in ethanol solution (wt %) | Oxygen plasma treatment | Tensile strength after carbonization (kg/cm²) | Tensile strength after graphitization (kg/cm²) |
| --- | --- | --- | --- | --- |
| 6-1 | 0.0 | treated | 210 | 160 |
| 6-2 | 2.5 | treated | 280 | 250 |
| 6-3 | 5.0 | treated | 310 | 280 |

TABLE 3-continued

| Example No. | Concentration of each of PXG and PTS in ethanol solution (wt %) | Oxygen plasma treatment | Tensile strength after carbonization (kg/cm²) | Tensile strength after graphitization (kg/cm²) |
| --- | --- | --- | --- | --- |
| 6-4 | 7.5 | treated | 300 | 280 |
| 6-5 | 0.0 | non-treated | 160 | 120 |
| 6-6 | 2.5 | non-treated | 210 | 180 |
| 6-7 | 5.0 | non-treated | 80 | 60 |
| 6-8 | 7.5 | non-treated | 40 | 40 |

EXAMPLE 7

An adhesive of a B-stage COPNA resin was obtained by mixing a coal pitch having a softening point of 235° C. with a purified methylnaphthalene at a weight ratio of 1:2 to form a condensed polycyclic aromatic compound, adding p-xylylene glycol as a crosslinking agent to the above compound at a weight ratio of 1:0.8, adding 10 wt % of p-toluenesulfonic acid, 5 wt % of sulfur, and 30 wt % of raw coke ground to 5 μm or less as an aggregate to the thus obtained mixture, and then reacting the resulting mixture at 120° C. for 15 minutes. As an adherend, a test piece was used, which was obtained by abrasive-finishing a 2 cm² adherend surface of a graphite material (manufactured by Ibiden Co., Ltd., trade name T-4 or ET-10, tensile strength: about 200 kg/cm²) and washing the thus abraded adherend surface with supersonic waves in acetone.

The above adhesive was coated onto the thus treated surface of the adherend at room temperature, and then bonded to another adherend. After the bonded adherends were fixed by a metallic jig, the adhesive was hardened by heating at 180° C. for 60 minutes. After the jig was removed following the hardening, the adhesive joint was carbonized by raising a temperature up to 1000° C. at a temperature-rising rate of 30° C./hr in a non-oxidizing atmosphere.

In the meanwhile, test pieces were prepared according to similar treatments by using an adhesive having no aggregate.

With respect to the carbonized test pieces, the thickness of the adhesive layer was measured by an optical microscope, and then the tensile strength of the adhesive joint was measured. Results thereof are shown in Table 4.

3.8, 4.8, and $6.3 \times 10 - 6/°$ C., respectively) to form a disc shape after bonding. The adhesive joint was carbonized after the bonding under the same conditions as in Example 1. The carbonized test piece was heated up to 2000° C. at a temperature-rising rate of 400° C./hr in a non-oxidizing atmosphere, thereby graphitizing the adhesive joint. In order to examine thermal shock resistance of the graphitized test piece, the peripheral portion of the test piece was rapidly heated by means of a high frequency induction heater manufactured by Fuji Denpa Co., Ltd. and a time until the test piece was broken was measured. The thermal shock resistance was evaluated on the basis of a thermal shock resistance index FI calculated according to the following equation:

$$FI = 5.46 + 4.43 ln(t/n)$$

wherein t and n are a power-loading time period and a power-factor, respectively.

The results were as follows:

| | |
| --- | --- |
| 20 KW | 3.14 |
| 30 KW | 2.34 |
| 40 KW | 1.44 |
| 50 KW | 1.00 |

The larger the FI value, the larger the thermal shock resistance. Results obtained are shown in Table 5.

TABLE 5

| Adhesive | Aggregate | Adherend | | |
| --- | --- | --- | --- | --- |
| | | T-6 | T-4 | ET10 |
| a | not added | 1.0 | 6.0 | 6.3 |
| | 1 | 5.0* | 8.0 | 8.2 |
| | 2 | 2.3 | 7.1 | 10.4 |
| | 3 | 1.4 | 3.8 | 9.1 |
| b | not added | 2.2 | 7.0 | 7.2 |
| | 1 | 5.8* | 8.6* | 7.7 |
| | 2 | 4.3 | 8.2 | 9.0 |
| | 3 | 1.8 | 6.3 | 8.6 | n = 4
*broken at a portion other than adhesive joint
FI value index of thermal shock resistance As is evident from the above, the adhesion structure according to the invention is more excellent in respect of the bonding strength, the heat resistance and the waterproofness than the adhesion structures using adhe-

TABLE 4

| Example No. | Adherend | Thickness of adhesive layer (μm) | Aggregate | Average tensile strength (kg/cm²) | Number of broken adherends without adhesion layer |
| --- | --- | --- | --- | --- | --- |
| 7-1 | T-4 | 9 | added | 170 | ¾ |
| 7-2 | ET10 | 11 | added | 150 | 2/4 |
| 7-3 | T-4 | 6 | not added | 120 | 0/4 |
| 7-4 | BT10 | 5 | not added | 140 | ¼ |

EXAMPLE 8

The adhesive (a) used in Example 1 and an adhesive (b), in which 5 wt % of sulfur was added to the adhesive (a), were used. Three kinds of (1) raw coke, (2) coal calcined coke and (3) artificial graphite each ground to 10 μm or less were used as an aggregate. The aggregate was added in an amount of 30 wt % to the adhesive. As an adherend, a half split disc having a diameter of 50 mm and a thickness of 4 mm with a hole of 8 mm in the center was worked from a graphite material (manufactured by Ibiden Co., Ltd., trade name T-4, T-6 or ET10 having thermal expansion coefficients (50°–400° C.) of sives composed of known thermosetting resins.

Further, any adherend can be bonded by means of the adhesives composition according to the invention so long as the adherend has, on its surface, at least one group selected from hydrogen atom, halogen atom, hydroxyl group, carbonyl group, carboxyl group, aldehyde group, epoxy group, lactone group, ether group, and acid anhydride group.

Further, the adhesion structure according to the invention is a conductive adhesion structure in which the adherend and the adhesive are bonded together through the above-mentioned surface treating agent and in which the hardened COPNA resin composition exhibits the electrical conductivity in the presence of the conductive promotion catalyst due to its aromatic conjugated system. Thus, the adhesion structure is a conductive adhesion structure exhibiting the electrical conductivity without needing any electrically conductive aggregate, as not seen in the conventional electrically conductive adhesion structures. In addition, such a conductive adhesion structure according to the invention has excellent heat resistance, waterproofness, dimensional stability, strength, heat conductivity, etc.

The conductive adhesion structure having such excellent heat resistance, waterproofness, dimensional stability, strength, heat conductivity, etc. can be used as structural materials, heat resistant materials, heat insulating materials, electric and electronic materials, sliding members, antistatic and electromagnetic shields, etc.

Moreover, the carbonaceous or graphitic adhesion structure is characterized by having the same thermal expansion coefficient as in the adhesive layer and the adherend. The thermal expansion coefficient of the adhesive layer mainly composed of the carbonized or graphitized substance can be controlled over a wide range by appropriately changing the kinds and amounts of additives such as the aggregate, sulfur, dinitronaphthalene, trioxane, etc. and the heat treating temperature during production.

Further, the adhesive strength is greatly improved when the surface functional groups are existent in the surface of the adherend. The thermal shock resistance of the adhesion structure according to the invention can be made conspicuously excellent because the adherend and the adhesive layer have the same thermal expansion coefficient and the adhesive strength is large.

The carbonization yield of the adhesive layer can be greatly improved by using heavy oil or pitch as a condensed polycyclic aromatic compound. In this case, since the thermosetting resin is produced through direct reaction between the condensed polycyclic aromatic molecule constituting pitch and the aromatic crosslinking agent, not only the carbonization yield is increased but also the shrinkage during the carbonization is small. Thus, satisfactory adhesive strength can be obtained by using no aggregate. Owing to this, the adhesion precision which is comparable with that in a precise machining can be obtained. As understood from the above-mentioned features, the adhesion structure according to the invention has the thermal shock resistance, the dimensional stability, strength and toughness as well as excellent adhesion dimensional precision which have not been attained by the conventional adhesion structures. Accordingly, without being limited to any size or shape, the adhesion structure according to the invention can offer heat resistive parts for jigs, crucibles, heaters, etc., intricately shaped parts for chemical reactors, parts for heat exchangers, carbon fiber/carbon composites, etc. as well as carbon and graphite structures of shapes which could not be attained by the conventional machining at all. Furthermore, the invention can simplify the processing steps which have been difficult to simplify. Due to these advantages, the invention can reduce costs to a large extent and therefore can greatly contribute to the industry.

What is claimed is:

1. An adhesion structure, comprising an adhesive made from a thermosetting resin composition obtained by a reaction of (a) a condensed polycyclic aromatic compound having at least two rings, (b) an aromatic crosslinking agent having one or more aromatic rings with at least two hydroxymethyl or halomethyl groups, wherein a molar ratio of (b) to (a) is 0.5–4.0, and (c) an acid catalyst added to a mixture of (a) and (b) in an amount of 0.1–10 wt %, bonded to at least one surface of at least a pair of adherends having at least one moiety selected from the group consisting of hydrogen atom, halogen atom, hydroxyl group, carbonyl group, carboxyl group, aldehyde group, epoxy group, lactone group, ether group and acid anhydride group, through 0.01–5 wt% of a surface treating agent comprising said aromatic crosslinking agent.

2. The adhesion structure according to claim 1, wherein said adhesive further comprises a conductive promotion catalyst for the formation of a conjugated system having substantial electrical conductivity, said conductive promotion catalyst being at least one oxidizing agent selected from the group consisting of air, oxygen, ozone, sulfur, hydrogen peroxide, manganese dioxide, nitrous acid, nitric acid, permanganic acid, chromic acid, chloric acid, and hypochlorous acid, or a combination of at least one oxidizing agent selected from the group consisting of air, oxygen, ozone, sulfur, hydrogen peroxide, manganese dioxide, nitrous acid, nitric acid, permanganic acid, chromic acid, chloric acid, and hypochlorous acid and at least one substance selected from the group consisting of aluminum chloride, boron fluoride, sulfuric acid, phosphoric acid, organosulfonic acid, and carboxylic acid.

3. The adhesion structure according to claim 1, wherein said adhesive is at least partially reacted thermosetting resin composition.

4. The adhesion structure according to claim 1, wherein said condensed polycyclic aromatic compound (a) comprises at least one compound selected from the group consisting of naphthalene, anthracene, phenanthrene, pyrene, chrysene, naphthacene, acenaphthene, acenaphthylene, perylene, and coronene, or at least one compound selected from the group consisting of coal or petroleum heavy oil, tar and pitch.

5. The adhesion structure according to claim 1, wherein said acid catalyst (c) comprises at least one compound selected from the group consisting of aluminum chloride, boron fluoride, sulfuric acid, phosphoric acid, organosulfonic acid, and carboxylic acid.

6. The adhesion structure according to claim 1, wherein said adherend comprises at least one compound or composite selected from the group consisting of carbon, graphite, metal, metal oxide, metal carbide, metal silicide, metal boride, metal nitride, metal salt, glass, natural or synthetic polymer and a precursor thereof.

7. The adhesion structure according to claim 1, wherein said adherend is a combination of the same or different materials.

8. The adhesion structure according to claim 1, wherein said surface treating agent comprises said aromatic crosslinking agent (b) or a mixture of said aromatic crosslinking agent (b) and said acid catalyst (c) and acts to chemically bond said adhesive to the hydrogen atom, halogen atom, hydroxyl group, carbonyl group, carboxyl group, aldehyde group, epoxy group, lactone group, ether group or acid anhydride group in said adherend.

9. A method of producing adhesion structures, comprising the steps of:

(1) treating at least one surface of at least a pair of adherends having at least one moiety selected from the group consisting of hydrogen atom, halogen atom, hydroxyl group, carbonyl group, carboxyl group, aldehyde group, epoxy group, lactone group, ether group and acid anhydride group with 0.01-5 wt % of a surface treating agent comprising an aromatic crosslinking agent having one or more aromatic rings with at least two hydroxymethyl or halomethyl groups;

(2) heating the thus treated at least one surface;

(3) plasticizing or liquefying an adhesive made from a thermosetting resin composition obtained by a reaction of (a) a condensed polycyclic aromatic compound having at least two rings, (b) an aromatic crosslinking agent having one or more aromatic rings with at least two hydroxymethyl or halomethyl groups, wherein a molar ratio of (b) to (a) is 0.5-4.0, and (c) an acid catalyst added to a mixture of (a) and (b) in an amount of 0.1-10 wt %;

(4) applying the adhesive plasticized or liquefied at step (2) to the adherend coated with the surface treating agent at step (1); and (5) heating the resulting assembly at a temperature of 100°-400° C. in an oxidizing or non-oxidizing atmosphere to thermoset said adhesive.

10. The method according to claim 9, wherein said adhesive in step (3) is plasticized or liquefied in the presence of a conductive promotion catalyst, which is at least one oxidizing agent selected from the group consisting of air, oxygen, ozone, sulfur, hydrogen peroxide, manganese dioxide, nitrous acid, nitric acid, permanganic acid, chromic acid, chloric acid, and hypochlorous acid, or a mixture of at least one oxidizing agent and at least one substance selected from the group consisting of aluminum chloride, boron fluoride, sulfuric acid, phosphoric acid, organosulfonic acid, and carboxylic acid, and is used in the form of gas, liquid or solid.

11. The method according to claim 8, wherein said surface treating agent in step (1) is the same aromatic crosslinking agent as used in step (3) and is used as a liquid by heating at a temperature above its melting point or as a solution by dissolving into a solvent.

12. The method according to claim 8, wherein said surface treating agent in step (1) is a mixture of the same aromatic crosslinking agent (b) and acid catalyst (c) as used in step (3) and is used as a liquid by heating at a temperature above its melting point or as a solution by dissolving into a solvent.

13. The method according to claim 8, wherein said adhesive is a powdery mixture of a thermosetting resin composition comprising the condensed polycyclic aromatic compound (a), aromatic crosslinking agent (b) and acid catalyst (c).

14. The method according to claim 8, wherein said adhesive is a thermosetting intermediate reaction product having substantial thermoplasticity obtained by heating said thermosetting resin composition at a temperature of 60°-300° C. in an oxidizing or non-oxidizing atmosphere.

15. The method according to claim 8, wherein said plasticization in step (3) is carried out by heating said adhesive at a temperature of 60°-300° C. in an oxidizing or non-oxidizing atmosphere.

16. The method according to claim 8, wherein said liquefication in step (3) is carried out by dissolving said adhesive into a solvent.

17. A method of producing adhesion structures, comprising the steps of:

(1) plasticizing or liquefying an adhesive obtained by adding a thermosetting resin composition consisting of (a) a condensed polycyclic aromatic compound having at least two rings, (b) an aromatic crosslinking agent having one or more aromatic rings with at least two hydroxymethyl or halomethyl groups, wherein a molar ratio of (b) to (a) is 0.5-4.0, and (c) an acid catalyst added to a mixture of (a) and (b) in an amount of 0.1-10 wt %, with 0.01-5 wt % of said aromatic crosslinking agent or a mixture of said aromatic crosslinking agent and acid catalyst; and (2) applying said adhesive plasticized or liquefied at step (1) to at least one surface of at least a pair of adherends having at least one moiety selected from the group consisting of hydrogen atom, halogen atom, hydroxyl group, carbonyl group, carboxyl group, aldehyde group, epoxy group, lactone group, ether group and acid anhydride group; and (3) heating the resulting assembly at a temperature of 100°-400° C. in an oxidizing or non-oxidizing atmosphere to thermoset said adhesive.

18. The method according to claim 17, wherein said adhesive is plasticized or liquefied in the presence of a conductive promotion catalyst at step (1), wherein said conductive promotion catalyst is at least one oxidizing agent selected from the group consisting of air, oxygen, ozone, sulfur, hydrogen peroxide, manganese dioxide, nitrous acid, nitric acid, permanganic acid, chromic acid, chloric acid, and hypochlorous acid or a mixture of at least one oxidizing agent and at least one substance selected from the group consisting of aluminum chloride, boron fluoride, sulfuric acid, phosphoric acid, organosulfonic acid, and carboxylic acid, and is used in the form of gas, liquid or solid.

19. The method according to claim 17, wherein said liquefication at the step (1) is carried out by dissolving said adhesive into a solvent.

20. The method according to claim 17, wherein said adhesive is a powdery mixture of said thermosetting resin composition.

21. The method according to claim 17, wherein said adhesive is a thermosetting intermediate reaction product having substantial thermoplasticity obtained by heating said thermosetting resin composition at a temperature of 60°-300° C. in an oxidizing or non-oxidizing atmosphere.

22. The method according to claim 17, wherein said plasticization in step (1) is carried out by heating said adhesive at a temperature of 60°-300° C. in an oxidizing or non-oxidizing atmosphere.

* * * * *